US00RE45093E

(19) United States
(12) Reissued Patent
Hanna et al.

(10) Patent Number: US RE45,093 E
(45) **Date of Reissued Patent: *Aug. 26, 2014**

(54) SUBMERGED ENTRY NOZZLE WITH INSTALLABLE PARTS

(75) Inventors: Robert C. Hanna, Luxoria, AR (US); Kirby Joe Teeter, Dyersburg, TN (US)

(73) Assignee: Nucor Corporation, Charlotte, NC (US)

( * ) Notice: This patent is subject to a terminal disclaimer.

(21) Appl. No.: 12/770,252

(22) Filed: Apr. 29, 2010

Related U.S. Patent Documents

Reissue of:
(64) Patent No.: 7,363,959
Issued: Apr. 29, 2008
Appl. No.: 11/333,780
Filed: Jan. 17, 2006

(51) Int. Cl.
*B22D 11/10* (2006.01)
*B22D 41/50* (2006.01)

(52) U.S. Cl.
USPC ..... 164/489; 164/437; 222/606

(58) Field of Classification Search
USPC ..... 164/488, 489, 490, 437; 222/590, 591, 222/594, 606, 607, 629
See application file for complete search history.

(56) References Cited

U.S. PATENT DOCUMENTS

| | | | | |
|---|---|---|---|---|
| 3,991,815 | A | 11/1976 | Fastner et al. | |
| 5,227,078 | A | 7/1993 | Augustine, III | |
| 5,370,370 | A | 12/1994 | Benson | |
| 5,785,880 | A | 7/1998 | Heaslip et al. | |
| 5,944,261 | A | 8/1999 | Heaslip et al. | |
| 5,958,280 | A | 9/1999 | Reichelt et al. | |
| 5,961,874 | A | 10/1999 | Heasbe et al. | |
| 5,992,711 | A | 11/1999 | Mochizuki et al. | |
| 6,016,941 | A | 1/2000 | Damie | |
| 6,027,051 | A | 2/2000 | Heaslip et al. | |
| 6,279,790 | B1 | 8/2001 | Nomura et al. | |
| 6,410,469 | B1 | 6/2002 | Hoover et al. | |
| 6,425,505 | B1 | 7/2002 | Heaslip et al. | |
| 6,464,154 | B1 | 10/2002 | Heaslip et al. | |
| 6,586,355 | B2 | 7/2003 | Hoover et al. | |
| 6,932,250 | B2 | 8/2005 | Bederka | |
| 7,757,747 | B2 * | 7/2010 | McIntosh | 164/488 |
| 2006/0243760 | A1 | 11/2006 | McIntosh et al. | |

* cited by examiner

*Primary Examiner* — Kevin P Kerns
(74) *Attorney, Agent, or Firm* — Moore & Van Allen PLLC; Jeffrey R. Gray

(57) ABSTRACT

A partial SEN capable of having flow diverter parts installed therein, and a method of using the SEN in a continuous casting system are disclosed. The partial SEN includes a hollow distribution zone at a bottom portion of the SEN which is designed to allow the installation of at least two different types of flow diverter parts, one type of flow diverter parts for a first type of caster mold, and a second type of flow diverter parts for a second type of caster mold. The design of the flow diverter parts and the resulting angles achieved when the flow diverter parts are installed in the partial SEN are matched to a caster mold such that the flow characteristics of molten steel exiting the SEN into the caster mold during continuous casting operation are of a desired and optimal nature to prevent various types of casting defects.

7 Claims, 8 Drawing Sheets

500
501
502
510
520
530
A
A
B
B
C
C
D
D
E
E 560
570
503

540
504
550
A-A
B-B
C-C
D-D
E-E

SUBMERGED ENTRY NOZZLE WITH INSTALLABLE PARTS

Matter enclosed in heavy brackets [ ] appears in the original patent but forms no part of this reissue specification; matter printed in italics indicates the additions made by reissue.

CROSS-REFERENCE TO RELATED APPLICATIONS/INCORPORATION BY REFERENCE

U.S. Provisional Patent Application Ser. No. 60/594,665, which was filed on Apr. 27, 2005, is incorporated herein by reference in its entirety. U.S. Pat. No. 5,944,261, which issued on Aug. 31, 1999, is incorporated herein by reference in its entirety. U.S. Pat. No. 6,027,051, which issued on Feb. 22, 2000, is incorporated herein by reference in its entirety.

BACKGROUND OF THE INVENTION

In the continuous casting method of manufacturing steel, molten (liquid) steel from the steel-making operation or ladle metallurgy step is cast directly by a casting machine into semi-finished shapes (slabs, blooms, and billets). The terms "molten" and "liquid" are used interchangeably herein. The semi-finished shape is determined by the casting machine mold which receives the molten steel from a tundish and casts the steel into a steel strand with a molten inner core and an outer surface solidified by primary (water jacket) cooling within the mold. The strand is further subjected to secondary cooling upon exit from the mold until the entire strand is solidified at the time it is cut into slabs, blooms, or billets at the exit of the casting machine.

In the continuous casting process, the molten steel from the tundish flows into the mold through a submerged entry nozzle (SEN), which is connected to the outlet of the tundish, and the tundish is positioned so as to place the SEN into the mold to a selected depth. The flow of the molten steel from the tundish is gravity driven by the pressure difference between the liquid levels of the tundish and that at the top free surface of the mold. The flow is controlled by a stopper rod which partially blocks the tundish exit port, or a slide gate that moves across the inlet port of the SEN. As the steel enters the mold, the steel freezes against the water cooled walls and begins to form a shell, which is continuously withdrawn at the casting speed to produce the steel strand.

In such a process, the flow dynamics of the molten steel moving from the tundish to the mold can affect the quality of the continuous cast steel. The outlet ports of the SEN are below the liquid level in the mold. Turbulence and other transient phenomena in the molten steel exiting from the SEN into the mold may produce oxide inclusions and argon bubbles which other type inclusions may attach to, or high flow velocities may shear off droplets of mold slag into the steel flow where they become entrained in the liquid steel. Similarly, foreign particles trapped at the mold meniscus can similarly be entrained in the steel and generate surface defects and surface cracks. All of these produce inclusions that are product defects and result in product rejection and loss of manufacturing efficiency.

Such problems have a greater effect in thin slab casting, where inclusion entrapment due to the SEN-to-mold flow patterns occurs with a higher event frequency than in thick slab casting. This is due primarily to the thinner dimensions of the thin slab mold which require a higher flow velocity from a smaller geometry inlet nozzle to cast thin slab at the same throughput rate as thick slab. With thin slab casting, which is also known as Compact Strip Production, or CSP, the caster mold is too thin to permit a satisfactory submerged positioning of the nozzle inside the mold cavity. It is typically physically impossible for a CSP caster mold to accept a round SEN due to the narrow rectangular dimensions of the mold. Therefore, it is generally accepted by those skilled in the art of casting in a thin slab caster that the nozzle of the SEN has to be rectangular in shape to fit inside the mold.

An SEN may be manufactured having flow diverter parts such as flow dividers and baffles or flow diffusers in order to control the flow characteristics of the molten steel from the SEN into the mold. However, desired flow characteristics may be different for different types of molds.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

A first embodiment of the present invention provides a submerged entry nozzle (SEN) for flowing liquid metal therethrough. The SEN comprises an elongated bore having an inner surface defining at least one entry port at a top portion of the SEN and a hollow distribution zone at a bottom portion of the SEN. The hollow distribution zone is adapted to allow installation of any type of at least two different types of flow diverter parts corresponding to at least two different types of caster mold types having different width dimensions and which may be used for continuous casting of the liquid metal.

Another embodiment of the present invention comprises a method of preparing a continuous casting system for continuous casting of liquid metal to form a metal strand having a desired width. The method comprises selecting one type of flow diverter parts from at least two different types of flow diverter parts, where each type of flow diverter parts corresponds to a different type of caster mold having a different width dimension. The method further comprises installing the selected type of flow diverter parts into a hollow distribution zone of a bottom portion of a partial SEN to form a fully-assembled SEN. The method also comprises installing the fully-assembled SEN between a tundish and a caster mold of a liquid metal continuous casting system such that a width dimension of the caster mold matches an angle characteristic of the selected type of flow diverter parts.

A further embodiment of the present invention comprises a method of performing continuous casting of liquid metal. The method comprises directing a flow of the liquid metal from a ladle into a tundish. The method further comprises directing the flow of the liquid metal from the tundish into at least one entry port at a top portion of a submerged entry nozzle (SEN). The SEN includes at least one installable flow diverter part installed in a hollow distribution zone at a bottom portion of the SEN forming at least two exit ports that allow the liquid metal to flow out of the exit ports at angles determined by the at least one installable flow diverter part. The method also comprises directing the flow of the liquid metal out of the at least two exit ports and into a caster mold. The caster mold has a width dimension that is matched to the angles determined by the at least one installable flow diverter part.

These and other advantages and novel features of the present invention, as well as details of an illustrated embodiment thereof, will be more fully understood from the following description and drawings.

DETAILED DESCRIPTION OF THE INVENTION

Figure 1:
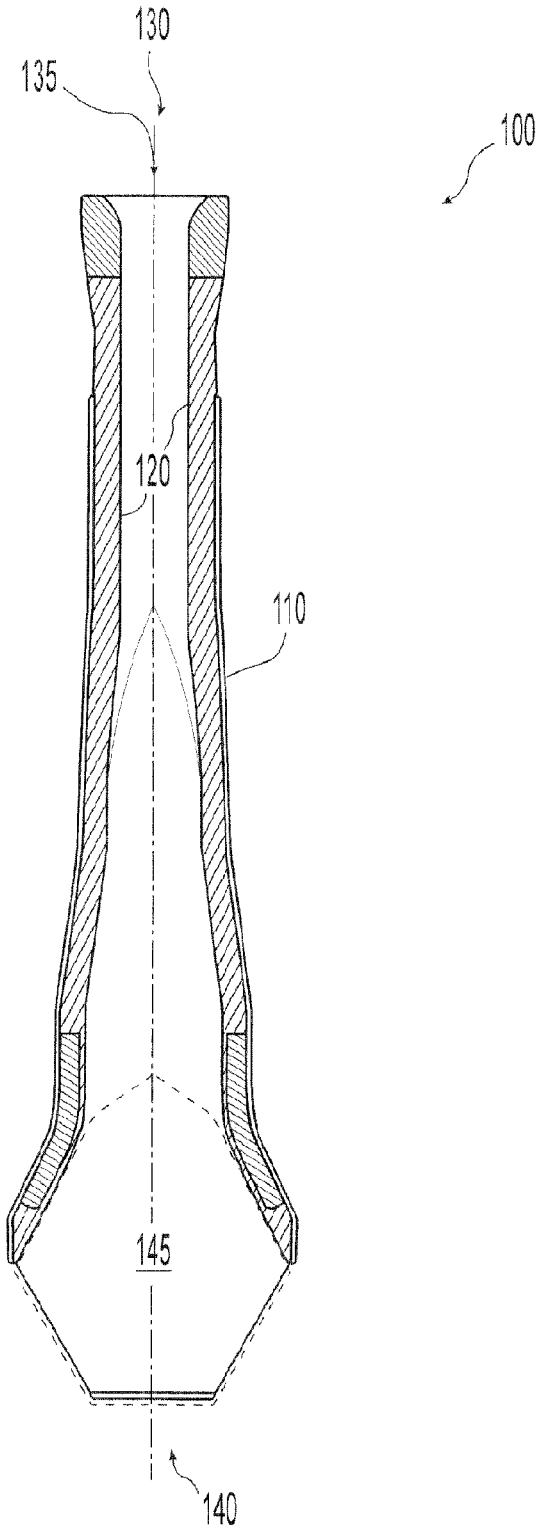
FIG. 1 illustrates a first exemplary embodiment of a submerged entry nozzle (SEN) which is capable of having flow diverter parts installed therein, in accordance with various aspects of the present invention.

FIG. 1 illustrates a first exemplary embodiment of a partial submerged entry nozzle (SEN) 100 which is capable of having flow diverter parts installed therein, in accordance with various aspects of the present invention. The SEN 100 includes a body having an elongated bore 110 having an inner surface 120, an entry port 135, or inlet capable of receiving an incoming flow of molten steel from the tundish, at a top portion 130 of the SEN 100, and a substantially hollow distribution zone 145 (hollow before a full set of flow diverter parts are installed) at a bottom portion 140 of the SEN 100. A full set of flow diverter parts may include one flow diverter part or more than one flow diverter part, in accordance with various embodiments of the present invention. The hollow distribution zone 145 is configured to allow the installation of different types of flow diverter parts in order to match the output flow characteristics of the SEN 100 to a given type of caster mold. Liquid metal flows from the top portion 130 of the SEN 100 to the bottom portion 140 when in use in a continuous casting system.

The SEN 100 is manufactured without any flow diverter parts or with only a partial set of permanently installed flow diverter parts (referred to as a partial SEN) but with the capability of having different types of flow diverter parts installed before use in a continuous casting system. When flow diverter parts are installed in the partial SEN, the partial SEN becomes a fully-assembled SEN. The different types of flow diverter parts are designed to be matched to different types of caster molds that may be used in the continuous casting system for manufacturing different dimensions of steel slab, etc. In particular, any given type of flow diverter parts are designed such that the flow characteristics of the liquid metal (e.g., molten steel) out of the SEN and into a corresponding caster mold are such that the problems described in the background section herein are minimized. As a result, a common or universal partial SEN may be manufactured which is adaptable to different types of molds by installing the corresponding matched flow diverter parts after a decision is made as to which type of metal slabs to manufacture (e.g., deciding the width dimension of the steel slabs to manufacture today).

Figure 2:
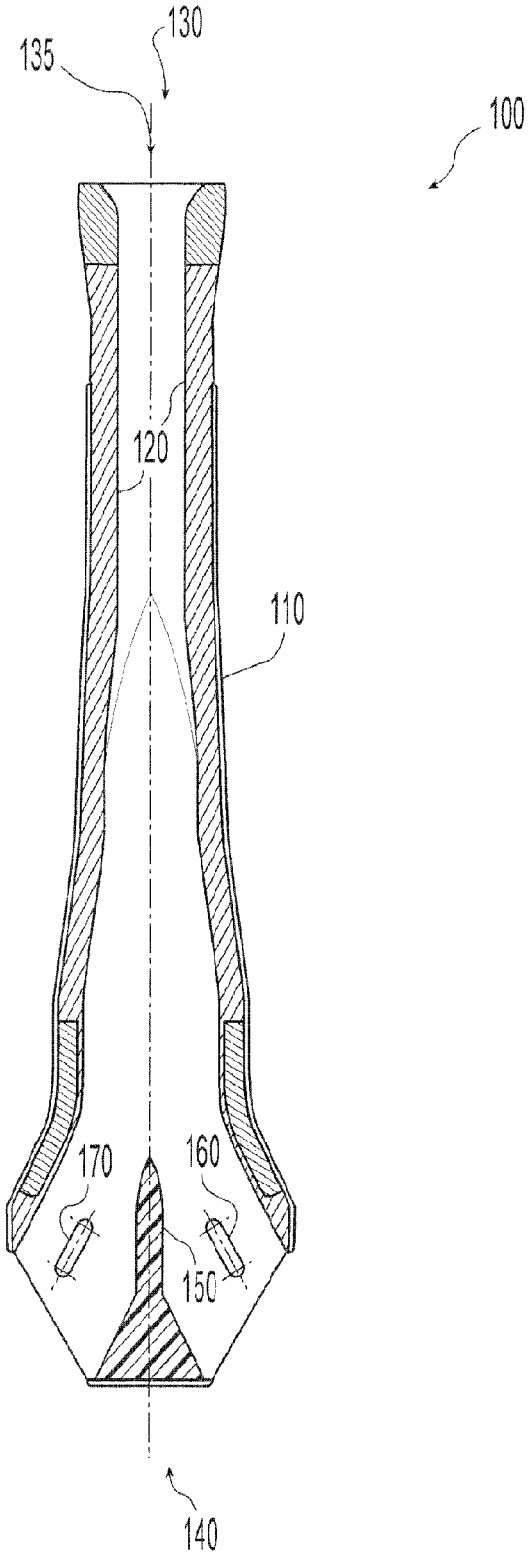
FIG. 2 illustrates the SEN of FIG. 1 having flow diverter parts installed therein, in accordance with an embodiment of the present invention.

FIG. 2 illustrates the partial SEN 100 of FIG. 1 having flow diverter parts 150, 160 and 170 installed therein forming a fully-assembled SEN, in accordance with an embodiment of the present invention. The flow diverter parts 150, 160, and 170 are installed in the hollow distribution zone 145. The flow diverter part 150 comprises a flow divider, and the flow diverter parts 160 and 170 comprise flow diffusers or flow baffles. The flow diverter parts 150, 160, and 170 are manually installed into the partial SEN 100 sometime after the partial SEN 100 has been manufactured. The flow diverter parts 150, 160, and 170 are installed using refractory glue or cement and dowel pins, in accordance with an embodiment of the present invention. The terms refractory glue and cement are used interchangeably herein. In accordance with other embodiments of the present invention, only refractory glue/cement may be used to hold the flow diverter parts in place, or only dowel pins may be used to hold the flow diverter parts in place. For example, glue with dove-tailed flow diverter parts may be acceptable for certain applications. Other methods of holding the flow diverter parts in place which may or may not use refractory glue/cement or dowel pins are possible as well, in accordance with alternative embodiments of the present invention.

Figure 3:
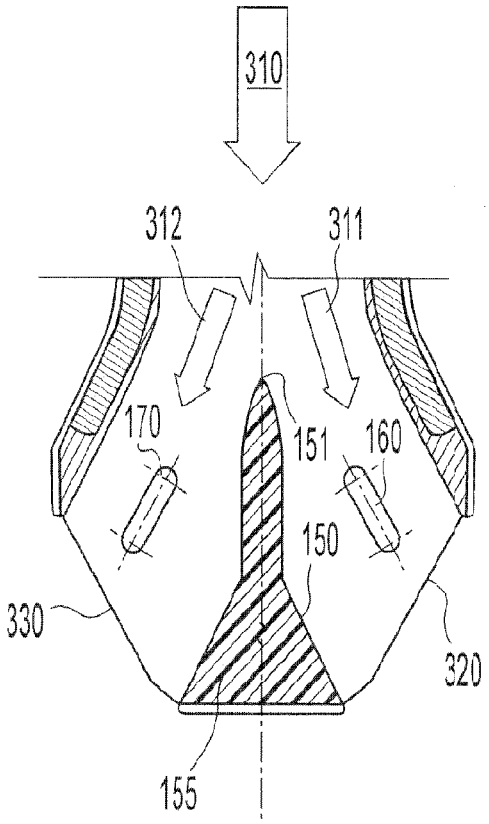
FIG. 3 illustrates the distribution zone at the bottom portion of the SEN of FIG. 1 having flow diverter parts installed therein, in accordance with an embodiment of the present invention.

FIG. 3 illustrates the distribution zone 145 at the bottom portion of the SEN 100 of FIG. 1 having flow diverter parts 150, 160, and 170 installed therein, in accordance with an embodiment of the present invention. During operation, the distribution zone 145 is supplied with a concentrated and uniform stream 310 of liquid steel from the up-stream portion of the SEN 100. The concentrated stream 310 is divided into two equal streams 311 and 312 upon entry into the distribution zone 145. The flow divider 150 finalizes the flow division, which begins at the entry to the distribution zone 145 above the lead point 151 of the flow divider 150. The flow divider 150 is provided with an increasing width base section 155 which provides angular displacement of the secondary steel flows 311 and 312 as necessary to suit the caster mold flow requirements. The flow divider 150 provides a substantially smooth transition of the concentrated stream 310 into the two equal secondary laterally angled steel streams 311 and 312.

Figure 4:
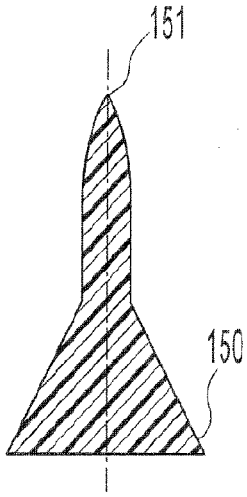
FIG. 4 illustrates an enlarged view of the flow divider shown in FIG. 2 and FIG. 3, in accordance with an embodiment of the present invention.

Dividing the stream into passageways for secondary lateral streams enables greater control of the steel exiting the ports 320 and 330, formed by the bottom portion of the SEN 100 and the flow diverter 150, when combined by the stream concentration, which has occurred upstream in the SEN 100. Each stream 311 and 312 has a uniform and laminar flow characteristic to aid in effectively producing a consistent stream at both lateral streams inside the caster mold. FIG. 4 illustrates an enlarged view of the flow divider 150 shown in FIG. 2 and FIG. 3, in accordance with an embodiment of the present invention. The flow divider 150 may have a vertical section with opposite sides thereof forming surface contours for directing the molten steel flow through lateral passageways.

To ensure that the correct stream orientations are effected downstream of the first lateral division of the concentrated flow 310 and the point 151 of the flow divider 150, one or more diffusers or baffles 160 and 170 are located upstream of the exit ports 320 and 330 to further divide the streams into upper lateral and lower lateral portions at each exit port. The diffusers 160 and 170 act to ensure that the steel stream has intimate contact with the exit port surfaces when exiting the SEN 100 to further separate and guide the streams through the distribution zone 145 to the exit ports 320 and 330.

The orientation (angle, location, and shape) of the flow diverter parts 150, 160, and 170 are specifically designed to ensure that each caster mold requirement may be optimized and, therefore, is designed differently for each application. In accordance with various embodiments of the present invention, the flow diffusers 160 and 170 may be downstream of the point 151 or may be upstream of the point 151. Various other flow diverter configurations are possible, as well, in accordance with various embodiments of the present invention (e.g., see U.S. Pat. No. 5,944,261 and U.S. Pat. No. 6,027,051). Again, the decision as to which type of flow diverter parts to install may be made after the partial SEN 100 is made and just before continuous casting of a steel strip commences.

In accordance with various alternative embodiments of the present invention, the flow diffusers (e.g., 160 and 170) may not be installable but the flow divider (e.g., 150) is installable. That is, the flow diffusers may be a permanent part of the partial SEN and only the flow divider is selected to be installed. Also, the SEN may not require any flow diffusers and may only use an installable flow divider. As a result, there may not be any permanent or installable flow diffusers for a particular SEN design. Such a design may be acceptable when a corresponding flow divider accomplishes the vast majority of the desired flow characteristics.

Figures 5A, 5B, 5C:
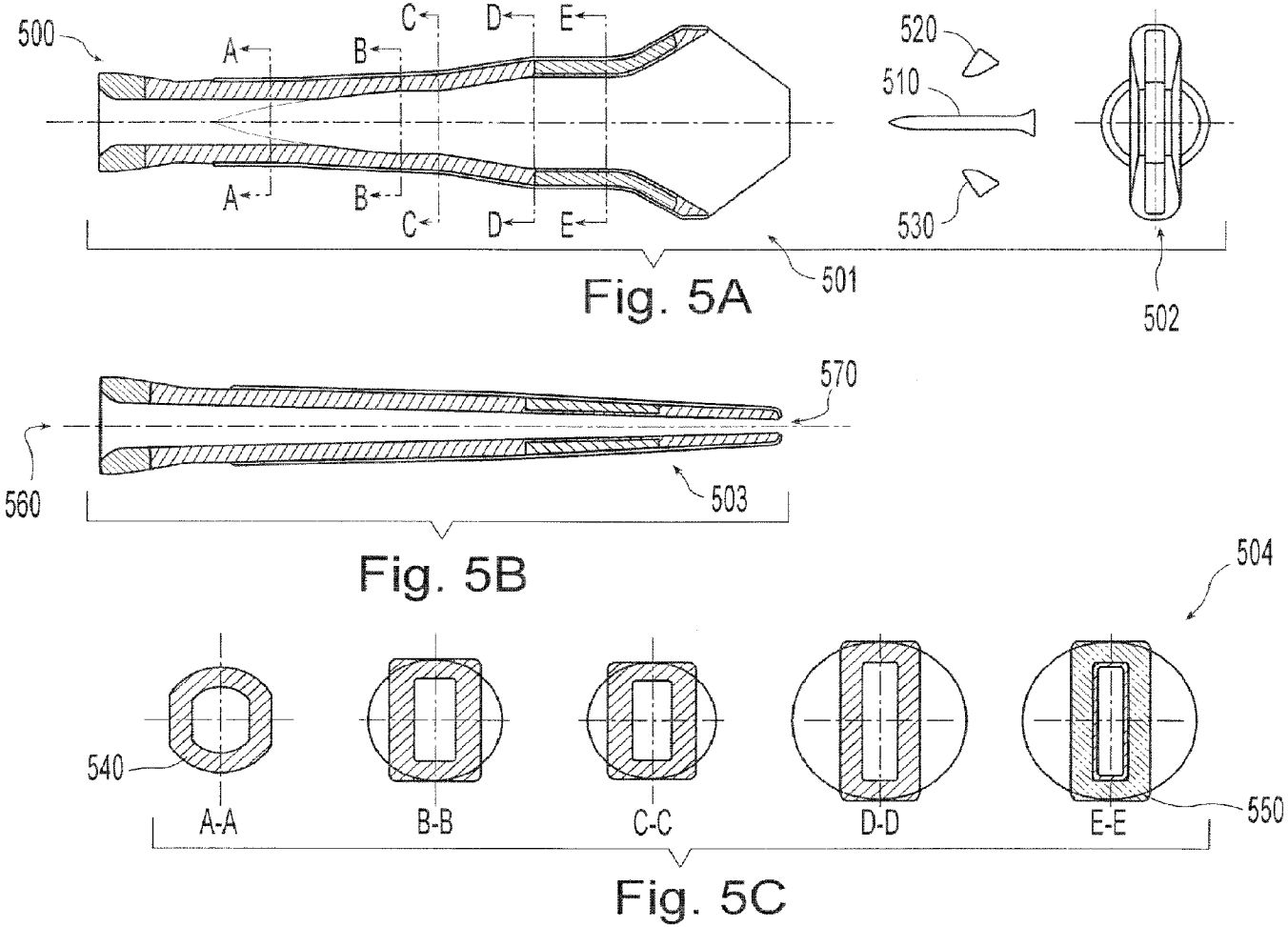
FIGS. 5a-5c illustrates a second exemplary embodiment of a submerged entry nozzle (SEN) with installable flow diverter parts showing various sections and relative dimensions, in accordance with various aspects of the present invention.

FIGS. 5a-5c illustrates a submerged entry nozzle (SEN) 500 with installable flow diverter parts 510, 520, and 530 showing various sections. FIG. 5a shows a sectioned plan view 501 of the SEN 500 along with uninstalled flow diverter parts 510, 520, and 530. FIG. 5a also shows a bottom end view 502 of the SEN 500. FIG. 5b is a sectioned elevation view 503 of the SEN 500. FIG. 5c shows several cross section views 504 of the SEN 500 taken along the sections A-A, B-B, C-C, D-D, and E-E. As can be seen in FIG. 5c, the cross section of the SEN 500 may change over the length of the SEN, from a substantially circular configuration to a substantially rectangular configuration. The inlet port cross section 540 is substantially circular to engage an outlet of a tundish (not shown), and the outlet port cross section 550 is substantially rectangular to engage the input side of a caster mold (not shown). The SEN may have a tapered cross sectional shape as shown in FIG. 5B from the substantially circular geometry to the distribution zone. The cross sectional transitions along the length of the SEN 500 may provide a uniform and concentrated column of steel within the SEN 500 as molten steel travels from the inlet 560 to the outlet 570 of the SEN 500.

Figure 6:
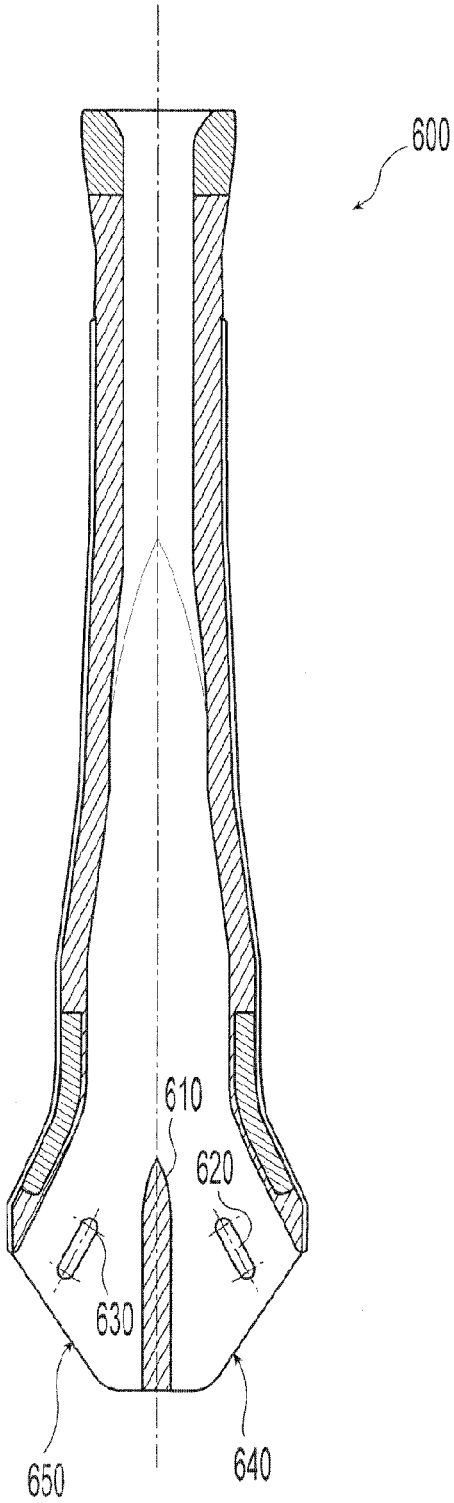
FIG. 6 illustrates a third exemplary embodiment of a submerged entry nozzle (SEN) with installable flow diverter parts, in accordance with various aspects of the present invention.

FIG. 6 illustrates a third exemplary embodiment of a submerged entry nozzle (SEN) 600 with installed flow diverter parts 610, 620, and 630, in accordance with various aspects of the present invention. As with the SEN 100, a uniform and concentrated stream of liquid steel is delivered to the distribution zone. However, the flow divider 610 may have a substantially uniform width without the broadened base section 155 of the flow divider 150. The flow divider 610 may have a vertical section with substantially straight sides as shown in FIG. 6, and may provide wider openings for the exit ports 640 and 650 to permit higher volume outlet flow of the molten steel.

Figure 7:
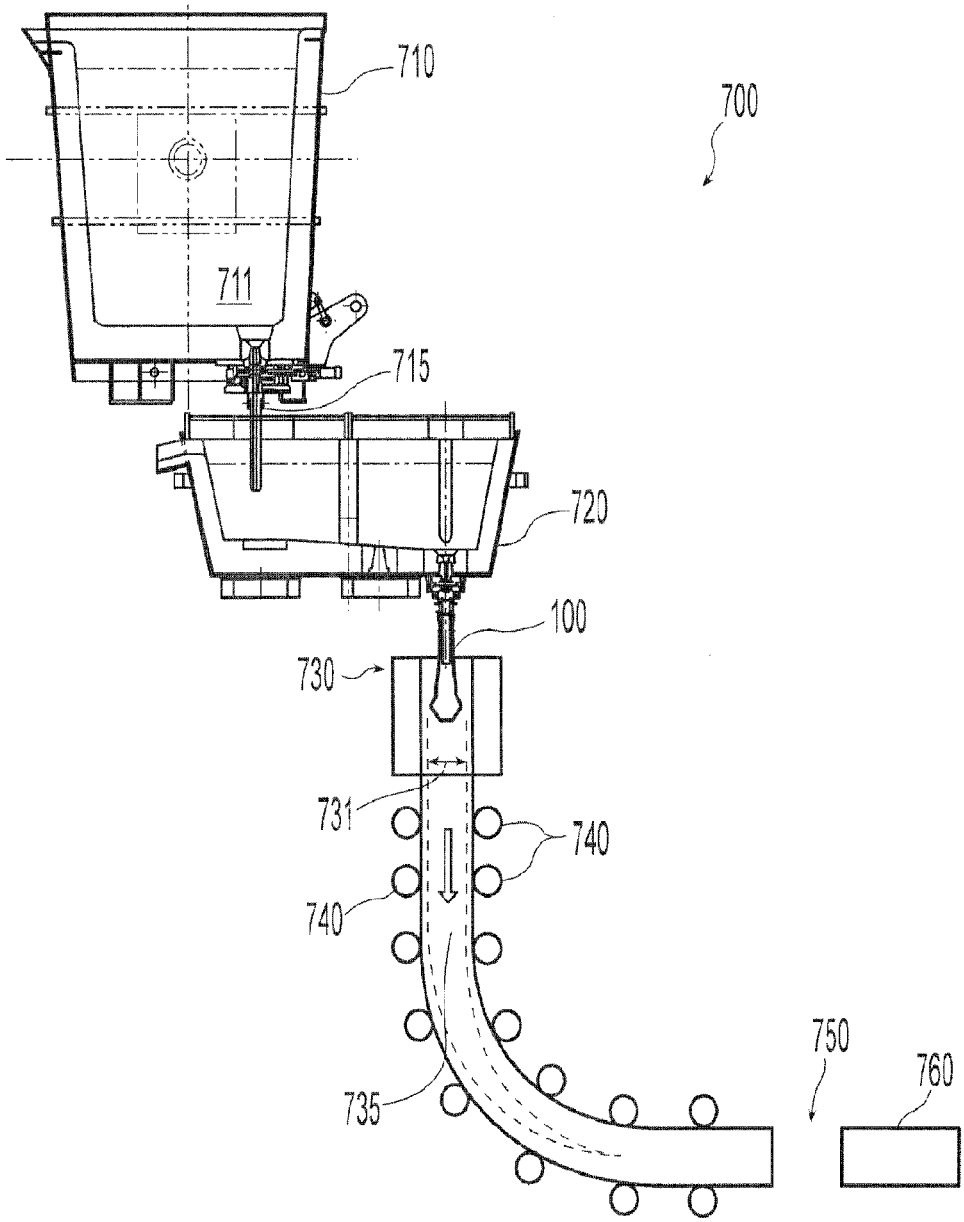
FIG. 7 illustrates a schematic block diagram of an exemplary embodiment of a continuous casting system which uses the SEN of FIG. 2, in accordance with various aspects of the present invention.

FIG. 7 illustrates a schematic block diagram of an exemplary embodiment of a continuous casting system 700 which uses the SEN 100 of FIG. 2, in accordance with various aspects of the present invention. The continuous casting system 700 includes a ladle 710 to provide molten steel 711 to a tundish 720 via a conduit 715. The tundish 720 directs the molten steel 711 to a caster mold 730 via a SEN 100 connected to a bottom of the tundish 720. Flow diverter parts have been installed in the hollow distribution zone 145 of the SEN 100 and are matched to at least a width dimension 731 of the caster mold in order to provide molten steel 711 having the desired flow characteristics from the exit ports of the SEN 100 to the caster mold 730. The steel strand 735 leaving the caster mold 730 enters a support roller assembly 740 which directs the strand 735 toward a cutting point 750 as the strand cools to a solid form. Water is sprayed onto the caster mold 730 and onto the steel strand 735 to induce the strand of liquid metal 735 to cool and solidify.

A method of preparing the continuous casting system 700 of FIG. 7 for continuous casting of liquid metal to form a metal strand having a desired width may include the steps of: selecting one type of flow diverter parts from at least two different types of flow diverter parts, each type of flow diverter parts corresponding to a different type of caster mold having different width dimensions; installing the selected type of flow diverter parts between a front wall and a back wall in a hollow distribution zone of a bottom portion of a partial SEN to assemble the SEN, the distribution zone of the assembled SEN comprising passageways for secondary flows formed at least partially by said flow diverter parts; and installing the fully-assembled SEN between a tundish and a caster mold of a liquid metal continuous casting system such that the width dimension of the caster mold matches an angle characteristic of the selected type of flow diverter parts.

For example, the partial SEN 100 is capable of having flow diverter parts 150, 160, and 170 installed as well as flow diverter parts 610, 620, and 630, but not at the same time. In order for the system 700 to be used with the caster mold 730, the partial SEN 100 is used and the flow diverter parts 150, 160, and 170 are selected because they are matched to the caster mold 730. That is, the flow diverter parts 150, 160, and 170, when installed in the partial SEN 100, will provide the proper flow characteristics of molten steel to the caster mold 730 based on the width dimension 731 of the caster mold 730. As a result, problems such as inclusion entrapment as described in the background section herein, as well as other problems, may be avoided. If a second caster mold having a different width dimension is used, the flow diverter parts 610, 620, and 630 may be installed in a partial SEN 100 and used in the system 700 to make steel strand of a different width dimension. Again, the flow diverter parts are matched to the second caster mold.

In accordance with the various embodiments of the present invention, the flow diverter parts may be installed in the SEN either before or after installing the SEN in the tundish to provide maximum flexibility of installation during use.

A method of performing continuous casting of liquid metal using the system 700 of FIG. 7 may include the steps of: directing a flow of liquid metal from a ladle into a tundish; directing the flow of the liquid metal from the tundish into at least one entry port at a top portion of a submerged entry nozzle (SEN); directing the flow of the liquid metal through the SEN, the SEN having at least one installable flow diverter part installed in a hollow distribution zone at a bottom portion of the SEN forming at least two exit ports of the SEN that allow the liquid metal to flow out of the exit ports at angles determined by the at least one installable flow diverter part; and directing the liquid metal to flow out of the at least two exit ports and into a caster mold having a width dimension which is matched to the angles determined by the at least one flow diverter part. The method may include the steps of: directing the liquid metal to exit the caster mold into a support roller assembly, the liquid metal beginning to harden into a solid metal strand having the width dimension defined by the caster mold; and cutting the solid metal strand across the width dimension to form a solid metal piece having a predetermined length. For example, the method may result in a plurality of solid metal slabs where the solid metal slab 760 of FIG. 7 illustrates just one of the solid metal slabs.

Figure 8:
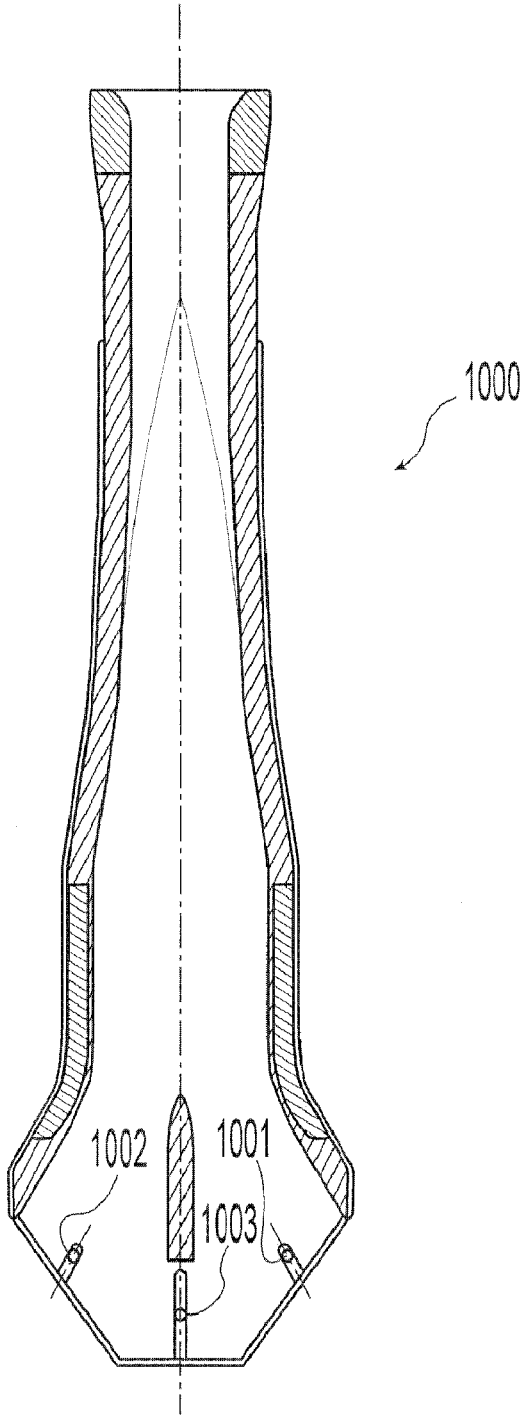
FIG. 8 illustrates a submerged entry nozzle (SEN) showing dowel pins that may be used to hold flow diverter parts in place.
Figure 9:
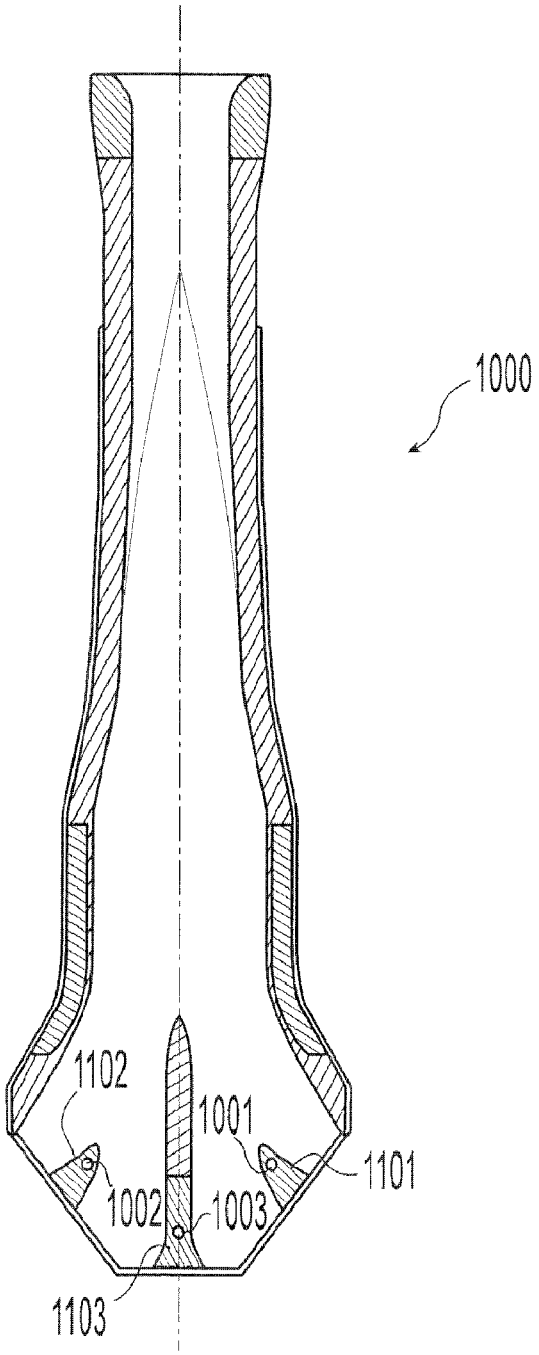
FIG. 9 illustrates the SEN of FIG. 8 showing dowel pins and installed flow diverter parts.

FIG. 8 illustrates an exemplary embodiment of a submerged entry nozzle (SEN) 1000 showing dowel pins 1001, 1002, and 1003 that may be used to hold flow diverter parts in place. FIG. 9 illustrates the SEN 1000 of FIG. 8 showing dowel pins 1001, 1002, and 1003 and installed flow diverter parts 1101, 1102, and 1103.

In summary, certain embodiments of the present invention provide a partial SEN having a hollow distribution zone into which flow diverter parts such as flow dividers and flow diffusers or baffles may be installed. Installed flow diverter parts are selected to match to a caster mold to be used in a continuous casting process of liquid metal. The partial SEN may be capable of having any of a number of different types of flow diverter parts installed, each type of flow diverter parts matching to a different type of caster mold having a different width dimension. Matching a type of flow diverter parts to a type of caster mold results in achieving desired flow characteristics of the liquid metal as the liquid metal transitions from the SEN into the caster mold.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of preparing a continuous casting system for continuous casting of liquid metal to form a metal strand having a desired width, said method comprising:

selecting one type of flow diverter parts from at least two different types of flow diverter parts, each type of flow diverter parts corresponding to a different type of caster mold having a different width dimension;

providing a partial submerged entry nozzle (SEN) for a continuous casting system comprising an inlet capable of receiving an incoming flow of molten steel from a tundish, a distribution zone, and a body having a bore, the SEN transitioning along the length of the body from a substantially circular geometry to a substantially rectangular geometry having opposing side walls and opposing front and back walls at said distribution zone;

installing said selected type of flow diverter parts into the distribution zone of the partial SEN to assemble the SEN to provide in the distribution zone of the assembled SEN passageways for secondary flows formed at least partially by said flow diverter parts, *wherein said flow diverter parts comprise at least a flow divider, a first diffuser, and a second diffuser, wherein said flow divider is installed upstream of said first diffuser and said second diffuser, and said flow diverter is configured to divide said liquid metal into a first stream and a second stream of liquid metal in said distribution zone, and wherein said first diffuser and said second diffuser are installed downstream of said flow diverter, said first diffuser is configured to further divide said first stream near a first exit port, and said second diffuser is configured to further divide said second stream near a second exit port*; *and* installing said SEN between a tundish and a caster mold of a liquid metal continuous casting system such that said selected type of flow diverter parts provide desired flow characteristics for molten metal.

2. The method of claim 1 having said installed flow diverter parts held in place within said hollow distribution zone by at Least one of a refractory cement and at least one dowel pin.

3. The method of claim 1 having the distribution zone of the assembled SEN having at least first and second lateral passageways having secondary flows formed by said installed flow diverter parts.

[4. The method of claim 1 having said selected flow diverter parts comprise at least one flow divider.]

[5. The method of claim 1 having said selected flow diverter parts comprise at least one flow divider and at least two flow diffusers positioned adjacent opposite sides of the flow diverter and located downstream of an upstream-most point of said at least one flow divider.]

6. The method of claim 1 having one said type of flow diverter parts being distinguished from any other said type of flow diverter parts at least by angles at which said liquid metal flows into a caster mold.

[7. The method of claim 1 having the distribution zone of the assembled SEN further comprising selected flow diverter parts adjacent passageway outlets dividing the molten steel secondary flows into four molten steel discharge flows delivering the molten steel to the mold with desired flow characteristics for molten metal.]

8. The method of claim 1 having said selected flow diverter parts including a flow divider comprising a vertical section with opposite sides thereof forming surface contours directing molten steel flow through said lateral passageways.

9. The method of claim 1 having said selected flow diverter parts including a flow divider comprising a vertical section with substantially straight sides.

10. The method of claim 9 having said SEN having a tapered cross sectional shape from said substantially circular geometry to said distribution zone.

* * * * *